(12) United States Patent
Martin et al.

(10) Patent No.: US 12,170,928 B2
(45) Date of Patent: Dec. 17, 2024

(54) TERMINAL DEVICE AND METHOD

(71) Applicant: Sony Corporation, Tokyo (JP)

(72) Inventors: Brian Alexander Martin, Basingstoke (GB); Shin Horng Wong, Basingstoke (GB); Martin Warwick Beale, Basingstoke (GB); Yuxin Wei, Basingstoke (GB); Vivek Sharma, Basingstoke (GB); Shinichiro Tsuda, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 563 days.

(21) Appl. No.: 16/475,688

(22) PCT Filed: Dec. 18, 2017

(86) PCT No.: PCT/EP2017/083279
§ 371 (c)(1),
(2) Date: Jul. 3, 2019

(87) PCT Pub. No.: WO2018/127395
PCT Pub. Date: Jul. 12, 2018

(65) Prior Publication Data
US 2019/0380073 A1    Dec. 12, 2019

(30) Foreign Application Priority Data
Jan. 5, 2017 (EP) ..................... 17150481

(51) Int. Cl.
*H04W 24/10* (2009.01)
*H04W 36/00* (2009.01)
(Continued)

(52) U.S. Cl.
CPC ....... *H04W 36/0094* (2013.01); *H04W 24/10* (2013.01); *H04W 36/06* (2013.01); *H04W 36/302* (2023.05)

(58) Field of Classification Search
CPC .... H04B 7/0695; H04B 7/088; H04B 17/318; H04B 7/0404; H04B 7/0456;
(Continued)

(56) References Cited

U.S. PATENT DOCUMENTS 10,512,008 B2 * 12/2019 Deenoo ................. H04W 24/10
2010/0003979 A1    1/2010 Iwamura
(Continued)

FOREIGN PATENT DOCUMENTS

| EP | 1143757 A1 | 10/2001 |
|---|---|---|
| WO | 2016/198124 A1 | 12/2016 |
| WO | 2017/196491 A1 | 11/2017 |

OTHER PUBLICATIONS

International Search Report and Written Opinion mailed on Jun. 27, 2018 for PCT/EP2017/083279 filed on Dec. 18, 2017, 10 pages.
(Continued)

*Primary Examiner* — The Hy Nguyen
(74) *Attorney, Agent, or Firm* — XSENSUS LLP

(57) ABSTRACT

The present technique provides a terminal device for use with a wireless telecommunications system, the terminal device comprising a receiver, a transmitter and a controller, wherein the controller is configured: to conduct a first measurement of a parameter associated with a radio signal transmitted by infrastructure equipment of the wireless telecommunications network and received by the receiver; to determine whether the measured parameter meets a predetermined criteria; and when the measured parameter is determined to meet the predetermined criteria, to conduct a second measurement of a parameter associated with a radio
(Continued)

signal transmitted by infrastructure equipment of the wireless telecommunications network and received by the receiver. The present technique also provides an associated method and circuitry.

13 Claims, 6 Drawing Sheets

(51) Int. Cl.
*H04W 36/06* (2009.01)
*H04W 36/30* (2009.01)

(58) Field of Classification Search
CPC .. H04B 7/0626; H04B 7/0408; H04B 7/0608; H04W 72/046; H04W 16/28; H04W 72/042; H04W 24/10; H04W 74/0833; H04W 28/04; H04W 36/00; H04W 36/30; H04W 56/001; H04W 72/02; H04W 72/04; H04W 72/08; H04W 76/27; H04W 36/00837; H04W 36/06; H04W 36/305; H04W 56/00; H04W 56/0045; H04W 72/0413; H04W 72/0493; H04W 74/02; H04L 5/00; H04L 5/0051; H04L 27/2607; H04L 5/0053; H04L 5/0091; H04L 5/0094

See application file for complete search history.

(56) References Cited

U.S. PATENT DOCUMENTS

| | | | |
|---|---|---|---|
| 2010/0296410 A1* | 11/2010 | Kazmi | H04W 24/10 370/252 |
| 2013/0059610 A1* | 3/2013 | Siomina | H04W 64/00 455/456.6 |
| 2016/0262077 A1 | 9/2016 | Zhang et al. | |
| 2018/0359790 A1* | 12/2018 | Ingale | H04W 28/16 |

OTHER PUBLICATIONS

Holma et al., "LTE for UMTS OFDMA and SC-FDMA Based Radio Access", Wiley 2009, System Architecture Based on 3GPP SAE, 11 pages.

Huawei et al., "Introduction of mobility enhancement UE capabilities", 3GPP TSG-RAN2 Meeting No. 95bis R2-166398, Kaohsiung, Oct. 10-14, 2016, 2 pages.

Zte et al., "Consideration on the RRM Measurement for NR", 3GPP TSG-RAN WG2 Meeting No. 96 R2-167836, Reno, USA, Nov. 14-18, 2016, 6 pages.

Samsung, "Cell Quality Derivation based on Measurements from Individual Beams", 3GPP TSG RAN WG2 #96 R2-168042, Reno, USA, Nov. 14-18, 2016, 5 pages.

Intel Corporation, "Measurements in NR", 3GPP TSG RAN WG2 Meeting No. 96 R2-168511, Reno, Nevada, Nov. 14-18, 2016, pp. 1-6.

Ericsson, "NR Cell association with beams for RRM measurements in connected mode", 3GPP TSG-RAN WG2 Meeting No. 96 R2-168724, Reno, US, Nov. 14-18, 2016, pp. 1-6.

NTT DOCOMO, "Revision of SI: Study on New Radio Access Technology", 3GPP TSG RAN Meeting No. 73 RP-161596 revision of RP-161214, New Orleans, Sep. 19-22, 2016, 7 pages.

Office Action issued Apr. 21, 2020 in European Patent Application No. 17 826 196.2, 7 pages.

Higuchi K et al., "Fast cell search algorithm in DS-CDMA mobile radio using long spreading codes", Vehicular Technology Conference, May 4-7, 1997, pp. 1430-1434, vol. 3., IEEE 47th Phoenix, AZ, USA.

* cited by examiner

TERMINAL DEVICE AND METHOD

CROSS-REFERENCE TO RELATED APPLICATIONS

The present application is based on PCT filing PCT/EP2017/083279, filed Dec. 18, 2017, which claims priority to EP 17150481.4, filed Jan. 5, 2017, the entire contents of each are incorporated herein by reference.

BACKGROUND

Field of the Present Technique

The present disclosure relates to a terminal device and method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficient connectivity for a wide range of devices associated with different applications with different characteristic data traffic profiles, resulting in different devices having different operating characteristics and/or requirements.

The introduction of new radio access technology (RAT) systems/networks therefore gives rise to new challenges. One such challenge is the need to develop effective techniques for mobility.

SUMMARY OF THE PRESENT TECHNIQUE

The present technique provides a terminal device for use with a wireless telecommunications system, the terminal device comprising a receiver, a transmitter and a controller, wherein the controller is configured: to conduct a first measurement of a parameter associated with a radio signal transmitted by infrastructure equipment of the wireless telecommunications network and received by the receiver; to determine whether the measured parameter meets a predetermined criteria; and when the measured parameter is determined to meet the predetermined criteria, to conduct a second measurement of a parameter associated with a radio signal transmitted by infrastructure equipment of the wireless telecommunications network and received by the receiver. The present technique also provides an associated method and circuitry.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description of example embodiments with reference to the accompanying drawings wherein like reference numerals designate identical or corresponding parts throughout the several views, and wherein.

DESCRIPTION OF EXAMPLE EMBODIMENTS

As mentioned above the embodiments of the present invention can find application with advanced wireless communications systems such as those referred to as 5G or New Radio Access Technology (NR). New Radio Access Technology has been proposed in [2] to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. The use cases that are considered can include:

Enhanced Mobile Broadband (eMBB)
Massive Machine Type Communications (mMTC)
Ultra Reliable & Low Latency Communications (URLLC)

Figure 1:
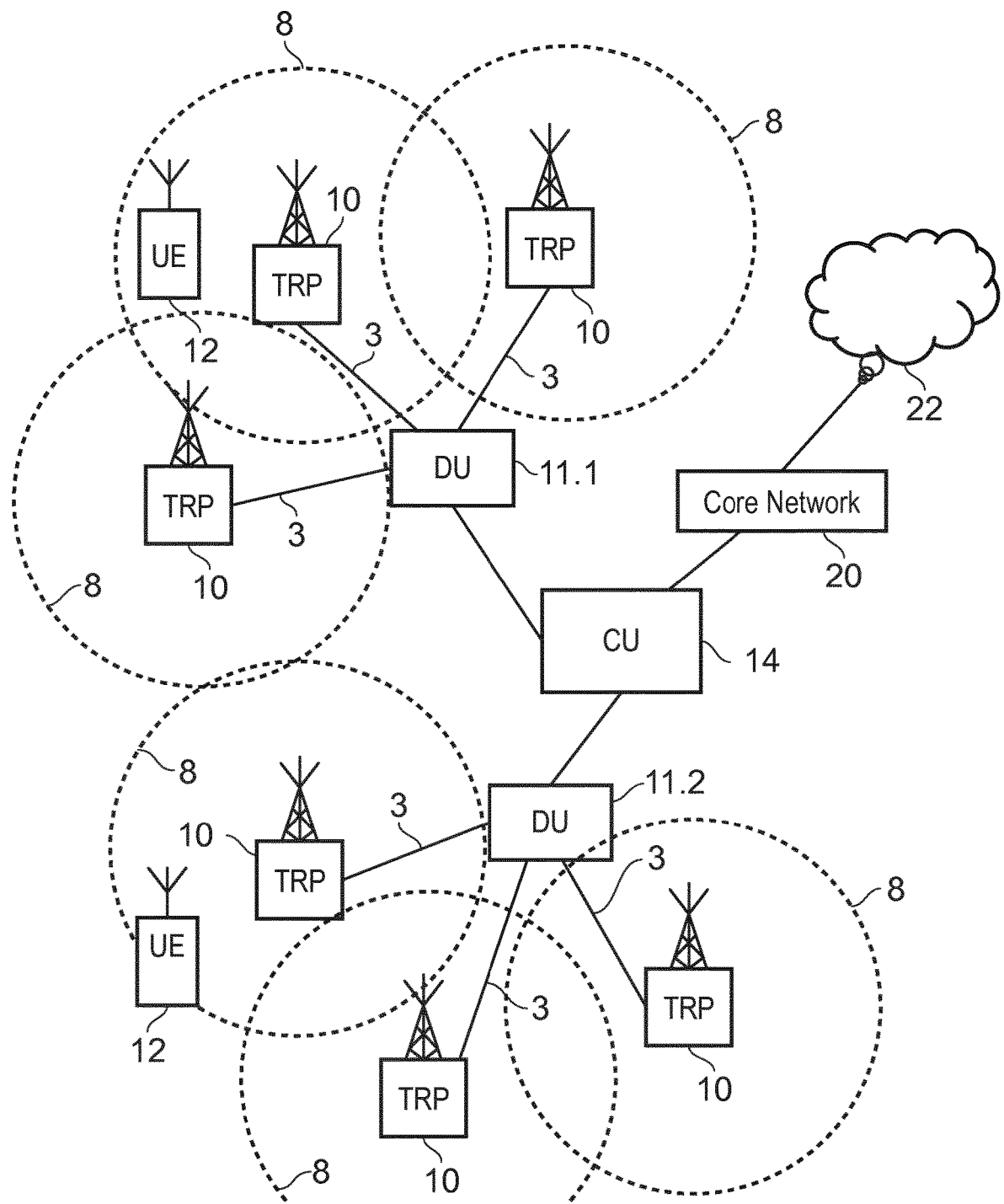
FIG. 1 is a schematic block diagram of a wireless communications system with architectural components corresponding to that of an example enhanced new radio or 5G network.

The aim of 5G is not only mobile connectivity for people, but to provide ubiquitous connectivity for any type of device and any type of application that would benefit from being connected. Many requirements and use-cases are still being discussed, but amongst those are:

Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a co-ordinating unit (CU) 14 via an interface 16. The co-ordinating unit 14 is then connected to the a core network 20 which may contain all other functions required to transmit data for communicating to and from the wireless communications devices and the core network 20 may be connected to other networks 22.

The elements of the wireless access network shown in FIG. 1 may operate in a similar way to corresponding elements of an LTE network well-known and defined in the relevant standards administered by the 3GPP (RTM) body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network. Base stations, which are an example of network infrastructure equipment, may also be referred to as transceiver stations/NodeBs/eNodeBs (eNBs), and so forth. Similarly the communications devices 12 may have a functionality corresponding to devices know for operation with an LTE network and may also be referred to as mobile stations, user equipment (UE), user terminal, mobile radio, communications device, terminal device and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Embodiments of the present technique concern an aspect of new radio which is referred to as beam forming. It has been proposed that a wireless communications interface provided to a future wireless communications network may be in a millimetre wave band so that radio communications have a relatively short range. Accordingly, it is proposed to use beam forming in which radio signals are transmitted from a plurality of antennas which combine coherently in a certain direction and so a signal power within this direction is significantly higher than a signal strength in other directions. Such an arrangement is disclosed by a more detailed representation of components shown in FIG. 1 in FIG. 2.

Figure 2:
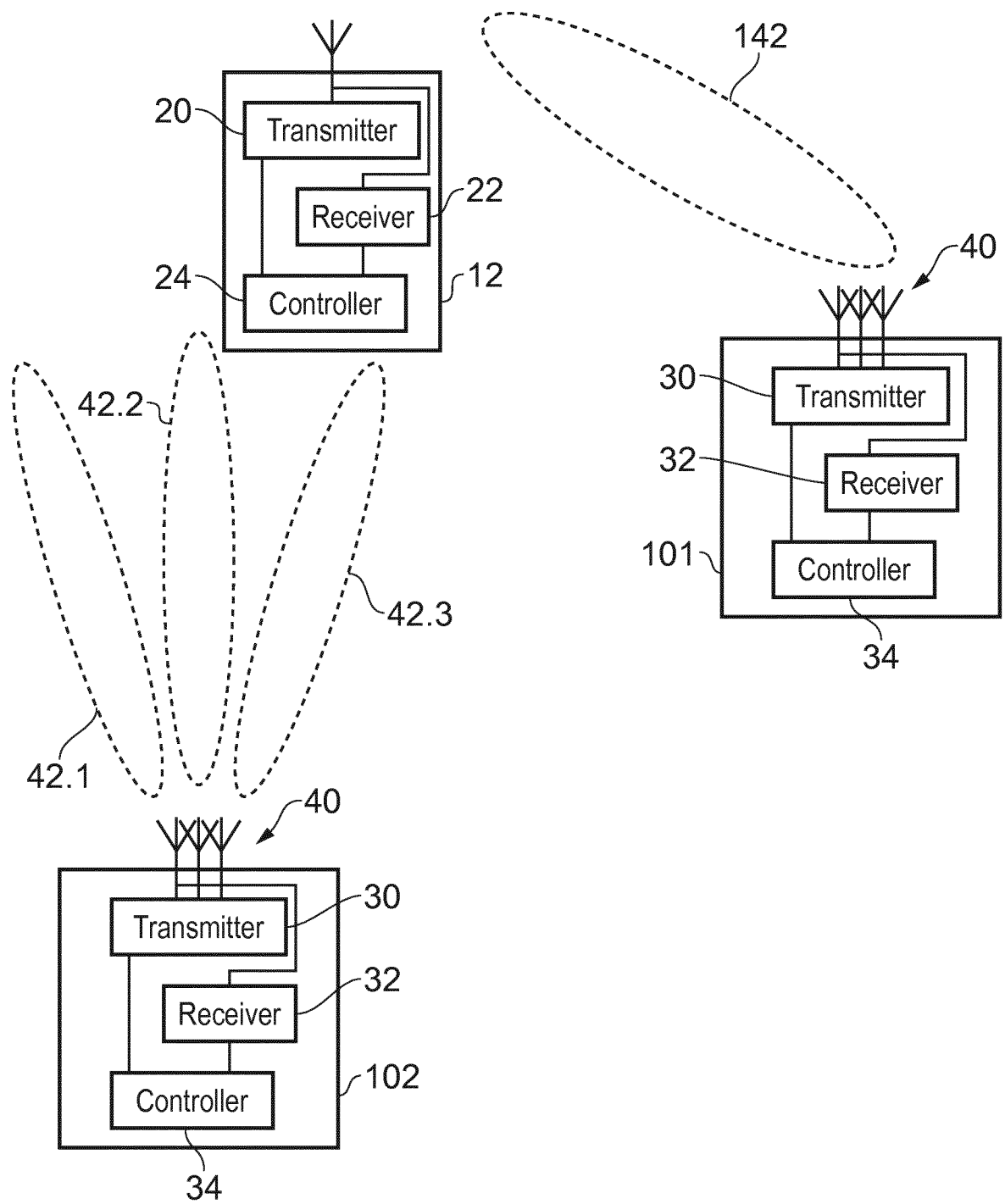
FIG. 2 is a schematic block diagram illustrating a communication device (terminal device) and a plurality of infrastructure equipment in which the infrastructure equipment transmit signals from different beams.

FIG. 2 provides a representation of a simplified implementation of two of the radio infrastructure equipment or TRP 101, 102 and a communications device or UE 12. As shown in FIG. 2 the communications device 12 includes a transmitter 20, a receiver 22 and a controller 24 which controls the transmitter and the receiver to transmit and receive signals representing data via the wireless access interface to the TRP 101, 102 and from the TRP 101, 102. The TRP correspondingly includes a transmitter 30, a receiver 32 and a controller 34. The transmitter 30 may include analogue and digital circuitry such as radio frequency circuits, analogue amplifiers as well as digital signalling processing software implemented as application specific semiconductor circuits, dedicated signalling processing logic and other processors. Similarly the receiver includes radio frequency circuitry signal processing software in the form of digital signal processors and other devices for detecting signals. The controller 34 is formed from control circuitry including processors executing software, application specific semiconductor circuits or hardware circuits executing digital logic. In some examples the controller can include a so-called "scheduler" which schedules the transmission of signals and the reception of signals via the wireless access interface. Similarly the transmitter 20 and the receiver 22 of the communications device may include analogue as well as digital components, radio frequency filters and transmitters as well as digital signal processing and software controlled processors. The control circuitry controls the transmitter and receiver using software control processors, application specific semiconductor devices or other digital hardware.

As shown in FIG. 2 each of the TRP 101, 102 includes a plurality of antennas 40. The antennas 40 may be used to form a multiple input, multiple output scheme. However in accordance with the present technique the signals transmitted by each of the antennas may be adapted in phase so that the signals add coherently in a particular direction with the effect that a signal strength of the radio signals transmitted in this direction is significantly higher than other directions. Accordingly the antennas in combination with a transmitter 30 can form the radio signals into a plurality of "beams" 42.1, 42.2, 42.3, 142.

Furthermore because of the nature of the transmission of radio signals within a millimetre waveband, the beams 42.1, 42.2, 42.3, 142 may be transmitted to particular communications devices 12 and each of the beams 42.1, 42.2, 42.3, 142 may be identified using some appropriate identifier. In some examples the identifier can be made using reference signals transmitted with the radio signals forming the beam 42. The identifier can additionally be associated with a timing of the transmission of the beams. The radio signals themselves may also include a cell identifier, which identifies the infrastructure equipment or TRP or group of TRPs supporting a cell which transmitted the signals. For this reason the term cell can be used interchangeably with TRP or infrastructure equipment which is operating to provide the cell. As shown in FIG. 2 one of the TRP 101, 102 can transmit a plurality of the beams 42.1, 42.2, 42.3 to the same communications device 12, which can therefore be individually identified. The beams 42.1, 42.2, 42.3 can also be transmitted in a broadcast manner, transmitting information such as synchronisation information, system information etc.

Figure 3:
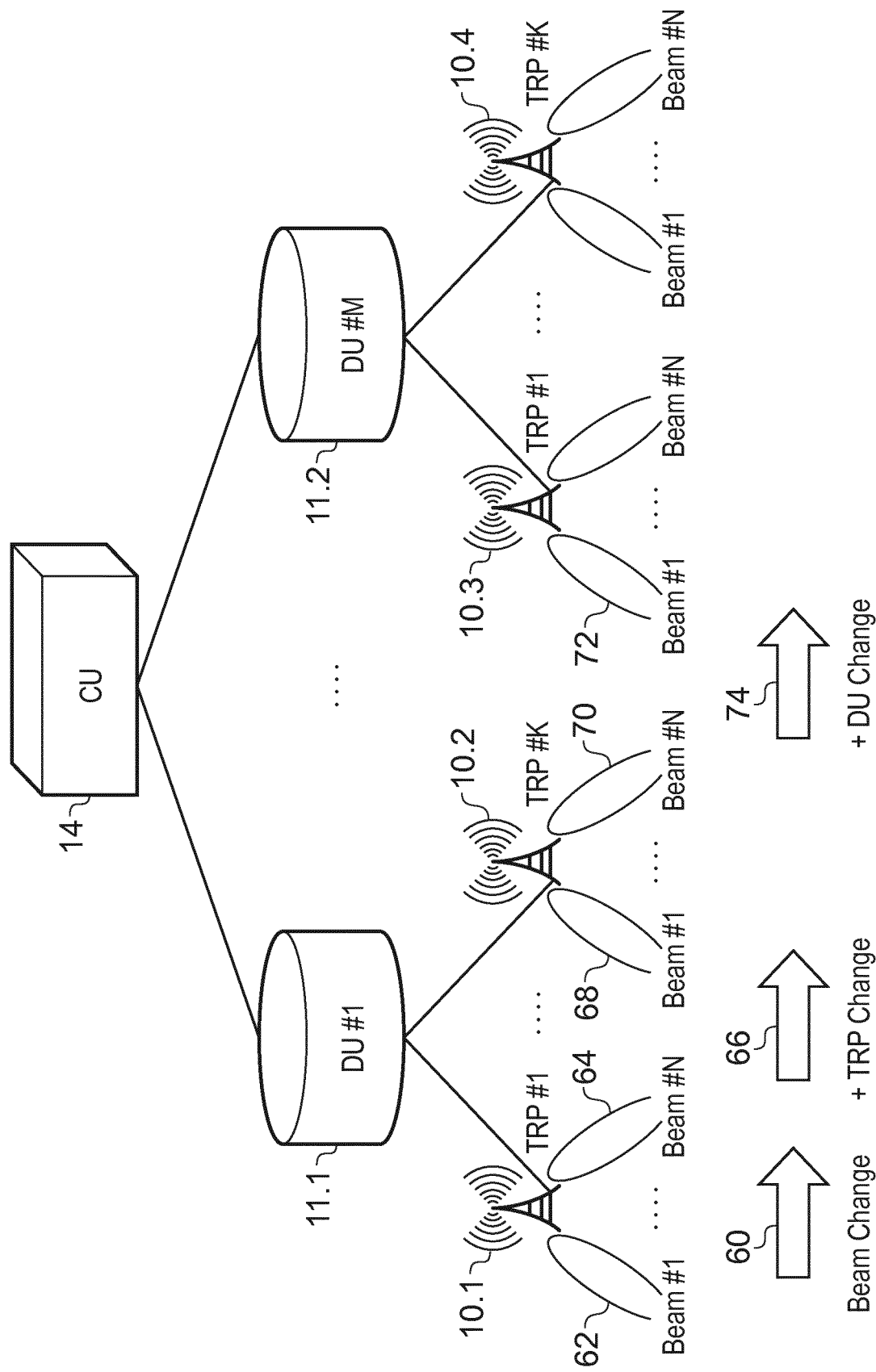
FIG. 3 is a simplified representation of the communications network showing in FIG. 1 illustrating a process of handover of a communications device as it travels throughout the wireless communications network.

FIG. 3 provides a schematic representation of the wireless communications network shown in FIG. 1 arranged to illustrate a scenario of communication with a UE 12 which is mobile. As will be appreciated if a UE 12 is transmitting from left to right and detecting the beams formed by the TRP 10.1, 10.2 the UE may be able to detect each of the beams in turn but not contemporaneously. Accordingly, the UE 12 should be arranged to hand over between different TRPs 102, 102 to transmit and/or receive signals represented as different beams as the UE travels from a left hand side of FIG. 3 to the right hand side. Thus as shown by a first arrow 60 as a UE 12 travels from an area where it can receive a first of the beams 62 to an area where it can receive a second of the beams 64, the UE 12 should hand over transmission and reception from the first beam 62 to the second beam 64. However as represented by a second arrow 66, as the UE travels further to detect a first beam 68 of a second TRP 102, then the UE should hand over from the first TRP 101 to the second TRP 102. Furthermore as the UE travels further to detect a further beam 72 transmitted by a third TRP 103, then the UE 12 should hand over from a first of the distributed units 11.1 to a second the distributed units 11.2. More details of the handover arrangement are disclosed in R2-166398 [3].

It will be appreciated that in order for the UE 12 to be handed over between different beams (as illustrated in FIG. 3), various measurements may be made in order to determine when and to which beam handover should occur. A list of some of the measurement events (events which will trigger a report to the network) supported in LTE are presented below. Future radio systems may also adopt corresponding events and so these may be correspondingly adapted in accordance with the number of beams provided by each cell in some embodiments of the present technique as explained above. The LTE events are as follows:

Event A1 (Serving becomes better than threshold)
Event A2 (Serving becomes worse than threshold)
Event A3 (Neighbour becomes offset better than PCell/PSCell)
Event A4 (Neighbour becomes better than threshold)
Event A5 (PCell/PSCell becomes worse than threshold1 and neighbour becomes better than threshold2)
Event A6 (Neighbour becomes offset better than SCell)

More description, in particular use of the above measurement events and the parameters used in the reporting criteria which may be varied according to embodiments of the present technique can be found in 3GPP TS 36.331 section 5.5.4, the contents of which are herein incorporated by reference.

Figure 4A:
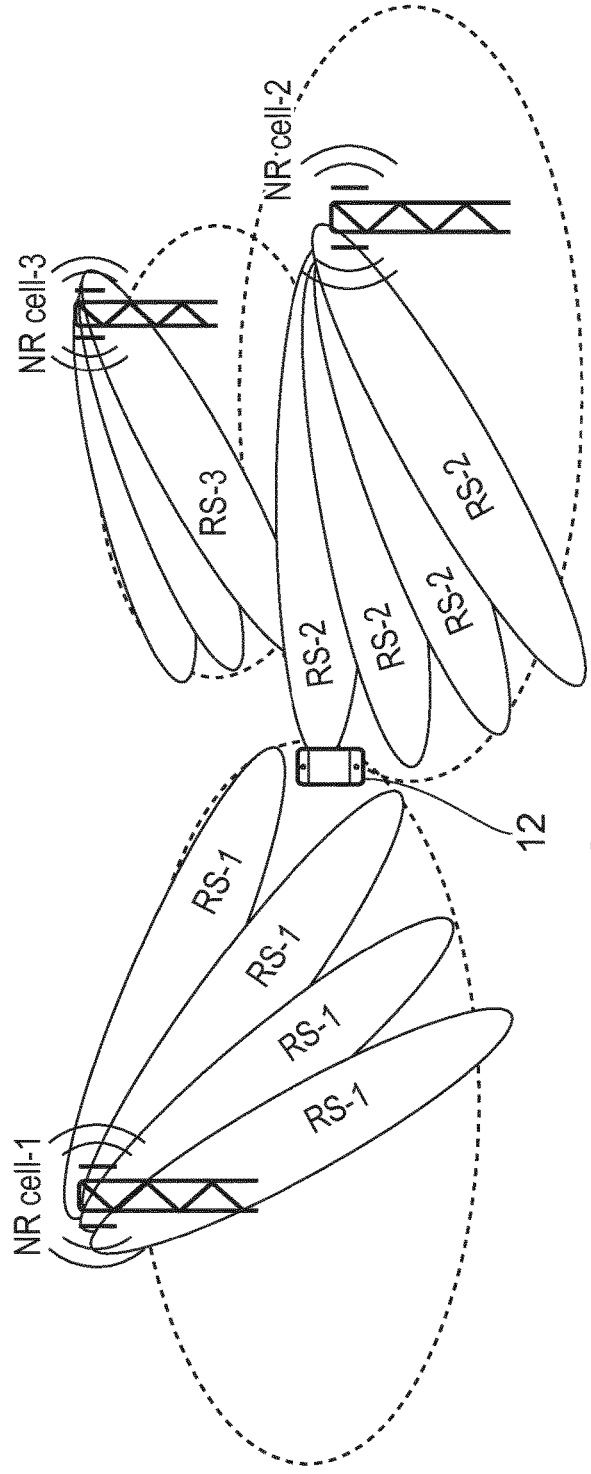
FIGS. 4A and 4B schematically show the difference between cell specific reference signals (CRS) and mobility reference signals (MRS)
Figure 4B:
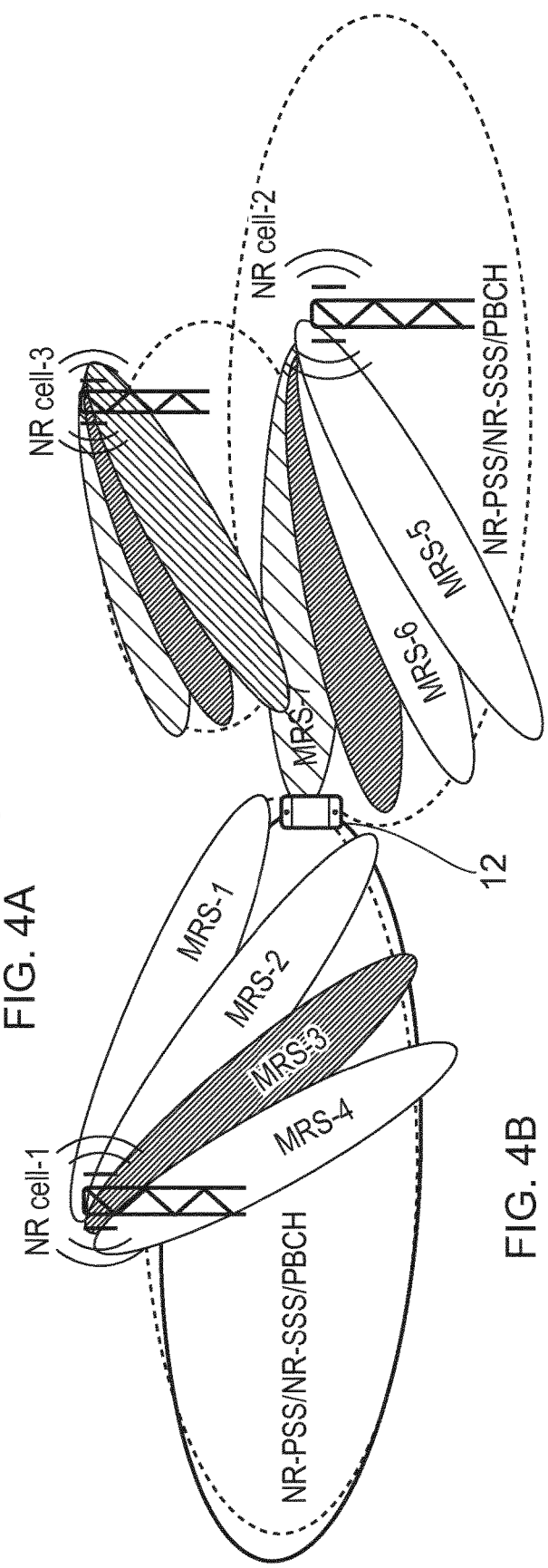

In NR, various agreements have been made with respect to downlink based mobility using beam measurements (see R2-167836 [4], R2-168042 [5] and R2-168511 [6], for example). It has been proposed in NR to have a cell specific reference signal (CRS) which is a reference signal transmitted by each TRP which identifies the TRP (and is the same for each beam transmitted by the TRP) and a mobility reference signal (MRS) which is a reference signal transmitted by each beam of each TRP which identifies that beam. Such an arrangement is shown in FIGS. 4A and 4B, which each show three NR TRPs (NR cell-1, NR cell-2 and NR cell-3). Each of the TRPs shown in FIGS. 4A and 4B is configured like one of the TRPs 10 previously described, for example. In FIG. 4A, the CRS of each TRP is shown. It can be seen that each beam of a particular TRP has the same CRS of that TRP (in particular, each beam of NR cell-1 has CRS "RS-1", each beam of NR cell-2 has CRS "RS-2" and each beam of NR cell-3 has CRS "RS-3"). In FIG. 4B, the MRS of each beam is shown. It can be seen that each beam is uniquely identified by a particular MRS (in particular, MRS-1 for a first beam, MRS-2 for a second beam, and so on).

As discussed in R2-168724 [7], each of CRS or MRS has different properties and advantages and disadvantages when it comes to its use in managing the mobility of a UE 12. In connected mode, it has been agreed that the idle mode use of CRS may be used to some extent. However, it is envisaged that, in connected mode, it is also advantageous for both types of reference signal (i.e. both CRS and MRS) to be used under different conditions. In particular, it is envisaged that there will be more use of MRS due to each MRS relating to an individual beam rather than to an entire cell (an individual beam being more precise and narrower than an entire cell). It is noted, however, that a UE 12 will have to perform a lot more simultaneous measurements when performing MRS measurements rather than just CRS measurements. This results in increased levels of processing and power consumption at the UE 12.

In addition, [6] proposes a new type of measurement event which combines events A2 and A3 (see above) in NR. The reason for this is that in dense deployments and/or at higher frequencies (as occurs in NR compared to LTE), the approach used for managing measurement events A2 and A3 and initiating handover in LTE is unlikely to be quick enough for NR. It is noted that, in LTE, the UE 12 first reports the event A2 to the network, and the network then configures the event A3. However, the proposal in [6] of combining the events A2 and A3 results in the UE having to perform neighbouring cell measurements and evaluation at all times. This again results in increased levels of processing and power consumption at the UE 12.

With this in mind, the present technique provides a terminal device (such as UE 12) for use with a wireless telecommunications system. The terminal device comprises a receiver (such as receiver 22), a transmitter (such as transmitter 20) and a controller (such as controller 24). The controller is configured to conduct a first measurement of a parameter associated with a radio signal transmitted by infrastructure equipment of the wireless telecommunications network and received by the receiver. The controller then determines whether the measured parameter meets a predetermined criteria. When the measured parameter is determined to meet the predetermined criteria, the controller then conducts a second measurement of a parameter associated with a radio signal transmitted by infrastructure equipment of the wireless telecommunications network and received by the receiver. In particular examples, the first measurement is a measurement of a first parameter associated with a first radio reference signal and the second measurement is a measurement of a second parameter associated a second radio reference signal.

Thus, with the present technique, a UE essentially uses one type of measurement to trigger another type of measurement. Specific examples of the present technique are discussed below.

One example of the present technique relates to reference signal types (in particular, measurements based on CRS or MRS, as described above). In this example, a UE 12 will normally only perform measurements on the less challenging (that is, less numerous) CRS reference signals (these being an example of a first radio reference signal). This enables the UE 12 to determine whether a handover is likely to be required. For example, the UE 12 may compare the cell qualities of each TRP by comparing each measured CRS. After it has been determined, based on the CRS, that a handover is likely to be required, only then does the UE 12 begin performing measurements on the more challenging (that is, more numerous) MRS reference signals (these being an example of a second radio reference signal). The MRS measurements then allows the UE 12 to determine when a handover should occur and which specific beams to use.

Another example of the present technique relates to measurement event types (in particular, the measurement events A2 and A3, as described above). In this example, rather than combining events A2 and A3 (as proposed in [6]) or reporting A2 to the network and the network enabling event A3 (as occurs in LTE), the UE 12 instead triggers the event A3 evaluation only when event A2 is met. This functionality may be preconfigured for implementation by the controller 24 of the UE 12, for example. In this example, detecting the occurrence of measurement event A2 requires the UE 12 to measure a reference signal of its serving TRP (this reference signal being an example of a first radio reference signal). Detecting the occurrence of measurement event A3 requires the UE 12 to measure a reference signal of a neighbouring TRP (this reference signal being an example of a second radio reference signal).

A combination of the above examples is also possible. For example the UE 12 may perform event A2 evaluation using CRS measurements, and may then trigger event A3 evaluation using MRS measurements. It will be appreciated that other types of measurements could also be triggered in a similar way (that is, on the basis of a result of a previous type of measurement).

Figure 5:
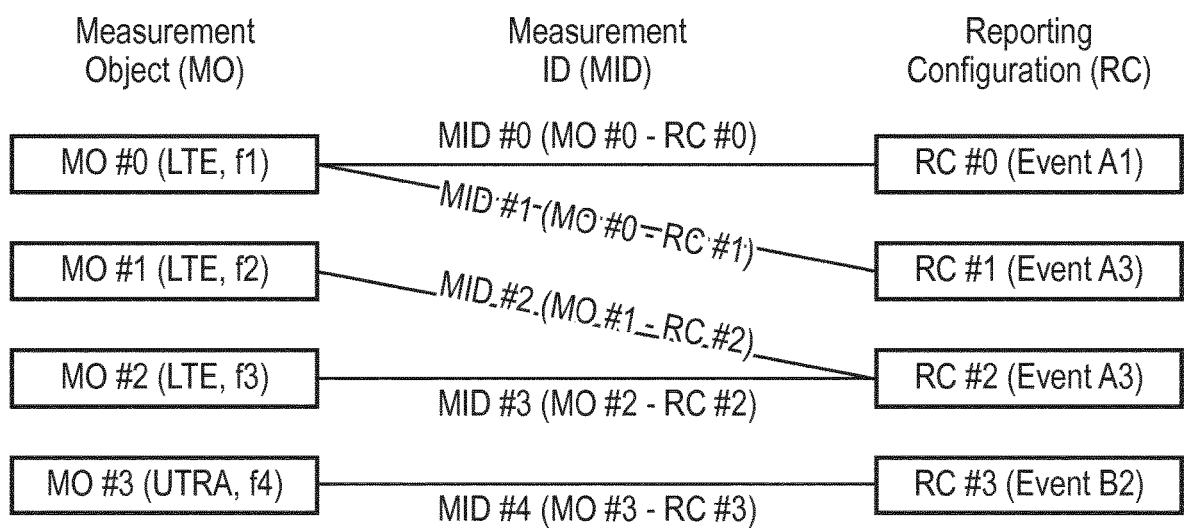
FIG. 5 schematically shows a measurement event configuration.

The measurement event configuration of LTE is shown in FIG. 5 (this has been reproduced from [4]). As can be seen, the approach of LTE is to configure measurement events individually, and to associate each measurement event with a measurement object. When configured, the UE 12 evaluates the measurement events associated with a measurement object, and reports when the conditions are met.

With the present technique, it is possible to configure interaction between the measurement objects, such that an inactive measurement object configuration is activated when certain criteria of a different measurement object/event is met. For example, in FIG. 5, the UE 12 will evaluate measurement object MO #O and reporting configuration RC #O (measurement ID MID #O) to evaluate event A2. When the event A2 criteria is met (in this case, serving becomes worse than a threshold) then the UE 12 automatically starts evaluating RC #1 and RC #2. RC #I is an intra-frequency measurement, which compares cells of the current frequency against the serving cell. RC #2 is an inter-frequency measurement, which compares cells of another frequency against the serving frequency. Note that in order to enable the inter-frequency measurement, RC #2 and MO #1, measurement gaps may be required. In this case, it is advantageous to notify the network of the requirement of this, in order that the TRP can avoid scheduling the UE during the measurement gaps. It is thus demonstrated how the enabling and/or disabling of certain measurements may be performed when certain criteria associated with other measurements is met.

It is noted that, in this example, instead of the UE 12 beginning to evaluate event A3 in the case that the event A2 criteria is met (that is, serving becomes worse than a threshold), alternatively, the UE 12 may begin evaluating event A3 in the case that a leaving condition of event A1 (serving becomes better than a threshold) is met. In this case, as long as the criteria of event A1 is being met (that is, serving is better than a threshold), event A3 is not evaluated. The UE 12 then begins evaluating event A3 only when the event A3 leaving condition is met. 3GPP TS 36.331 section 5.5.4 discusses the event A3 leaving condition in more detail. It will be appreciated that the above are just examples, however, and that, in general, the UE 12 may begin to evaluate event A3 when, for example, a reference signal of the serving TRP becomes less than a threshold.

In another example, there are different reference signals to measure. According to the example in FIG. 4B, there will be NR-PSS (primary synchronization signal)/NR-SSS (secondary synchronization signal) providing signals for measurement in idle mode (for example, for cell reselection). These signals (for example, CRS signals) may be transmitted using wider beams and provide an estimate of the cell coverage in idle mode and identify the cell. These signals might be transmitted only by overlay macro cells or by particular TRPs in a cell and provide a way to estimate whether connected mode mobility may be required. For example, if the UE is configured with a measurement in connected mode to compare the idle mode reference signals, it is possible to trigger measurements of the MRS only in certain conditions (for example, the UE reaching the cell border area, as determined by the CRS measurements). The MRS may be transmitted with a narrower beam and, additionally, identify certain beams as well as the cell, meaning that the UE needs to be able to detect and identify more (MRS) signals per cell than the idle mode (CRS) signals require.

In addition, the network may use additional nodes or TRPs to transmit signals to the UE in one cell. In order to perform a more accurate evaluation of cell quality, the UE identifies and measures beams from the additional TRPs in the overall cell quality evaluation.

The network may also use certain cells only in connected mode. For example NR cell-3 in FIG. 4B may not broadcast the system information, so may not be measured at all in idle mode, and may not be measured at all when UE is performing measurements of type 1 (that is, idle mode CRS measurements). When type 2 measurements (MRS measurements) are enabled, then the UE starts to take NR cell-3 into consideration.

With the present technique, triggering MRS measurements only when CRS measurements meet a certain criteria helps reduce the overall UE measurement effort when those criteria are not met (thus reducing processing and power consumption at the UE), while providing an accurate way to determine the connected mode coverage and cell/individual beam configurations that may be used to handover the UE when necessary.

In the above-mentioned examples, different measurement configurations may use different respective sets of reference signals. For example referring again to FIG. 5, the MID #O may be configured to use CRS signals, while MID #I may be configured to use MRS signals.

It is further envisaged that if only one set of reference signals is used for both NR idle mode and NR connected mode (or even if separate reference signals for NR idle mode or NR connected are present), then different tiers may be introduced for measurement performance using serving cell thresholds as a reference. For example, the network may configure two levels of a threshold similar to a so-called "s-measure" threshold. The concept of an s-measure threshold is known from LTE and is used to start measurements when the serving cell measurement falls below the s-measure threshold. A two level s-measure threshold may be applied to NR, in accordance with the present technique. In this case, the UE will not trigger any measurements until the first level of s-measure threshold (s-measure1) is met. Between s-measure1 and a second level of s-measure threshold (s-measure2), the UE is allowed to perform measurements with relaxed measurement performance (for example, perform measurements with less accuracy and small measurement gaps). However, when s-measure2 is met (and for measurements below s-measure2), the UE is required to perform accurate measurements within required measurement gaps. Thus, in this example, certain measurements are only triggered when the measurement of a reference signal is measured to be less than a threshold value (the threshold value being s-measure1 or s-measure 2 in this case).

It will be appreciated that, with the present technique, an event is triggered or a measurement object is activated on condition of another event (trigger event) occurring. It should be appreciated that this condition can involved more than one trigger event. For example, measurement X may be started if event trigger Z and event trigger Y are detected to have occurred with a predetermined time period (for example, N seconds) of each other.

It will be appreciated that the present technique reduces the amount of measurements the UE needs to take because the more challenging measurements are only performed when a condition is detected on the less challenging measurements (thus, most of the time, the UE only needs to undertake the less challenging measurements, such as measuring a smaller number of CRS signals rather than a larger number of MRS signals). This results in a reduction in processing and power consumption at the UE. The need for measurement gaps is also reduced (since the UE needs to switch the measurement frequency less often when a smaller number of CRS signals are measured compared to when a larger number of MRS signals are measured, for example).

With the present technique, it will be appreciated that any suitable parameter of a reference signal (be it a CRS reference signal or MRS reference signal) may be measured in order to determine whether the predetermined criteria associated with that reference signal measurement have been met (and therefore whether to initiate a further type of measurement). In an example, a suitable parameter may be one which gives an indication of the suitability of the TRP and/or beam for a terminal device to receive signals from the network via that TRP and/or beam. An example of such a parameter is the reference signal received power (RSRP) or reference signal receive quality (RSRQ) of the reference signal. Thus, for example, when a UE 12 initially only measures CRS reference signals, the UE 12 may know to begin measuring MRS reference signals when the CRS reference signal of its serving cell has a RSRP and/or RSRQ which falls below a predetermined threshold (the falling of the RSRP and/or RSRQ below this threshold being the predetermined criteria in this case). Similarly, a UE 12 may detect event A2 (or, alternatively, the event A1 leaving condition) and begin evaluation of event A3 when the CRS and/or MRS reference signal of its serving cell has a RSRP and/or RSRQ which falls below a certain threshold (the falling of the RSRP and/or RSRQ below this threshold being the predetermined criteria in this case). It will be appreciated that these are only examples, however, and that any suitable parameter which allows the UE 12 to operate according to the principles of the present technique could be used.

Other features of the measurement of the first and second parameters may also be implemented according to the present technique. For example, the first radio reference signal (of which a CRS signal is an example) may be associated with a first measurement gap pattern and the second radio reference signal (of which an MRS signal is an example) may be associated with a second, different, measurement gap pattern. In particular, the first radio reference signal may be associated with a measurement gap pattern with less measurement gaps per unit time than that of the second radio reference signal (as may occur when a smaller number of CRS signals are measured compared to a larger number of MRS signals, as mentioned above). A smaller number of measurement gaps per unit time results in reduced network overhead and reducing processing and power consumption at the UE. As another example, measurement of the first parameter may be repeated at a first measurement rate and measurement of the second parameter may be repeated at a second, different, measurement rate. In particular, the first measurement rate may be less than the second measurement rate (for example, the RSRP or RSRQ of CRS signals may be measured less frequently than the RSRP or RSRQ of MRS signals), thus further reducing the processing and power consumption at the UE when only the first parameter is being measured. It will be appreciated that other differences in way the that the first and second parameter measurements are implemented could also be considered.

It will be appreciated that the principle of the present technique may be extended to other embodiments. For example, it may be the case that a UE 12 monitors a reference signal of a neighbouring cell at two different rates or accuracies. During a first measurement of the reference signal (e.g. the RSRP or RSRQ of the reference signal), the UE 12 measures the reference signal at a first, less frequent rate and/or at a lower accuracy. Then, if the first measurement meets a predetermined criteria (e.g. if the RSRP or RSRQ of the reference signal exceeds a predetermined threshold), the UE 12 begins measuring the reference signal at a second, more frequent rate and/or at a higher accuracy. In this case, processing and power consumption at the UE 12 is reduced, since until the predetermined criteria are met, the UE 12 only has to perform the measurement of the reference signal at the lower rate and/or accuracy. It is noted that, in this case, both the first and second measurements are performed on the same parameter (e.g. the RSRP or RSRQ of the reference signal of the neighbouring cell).

Figure 6:
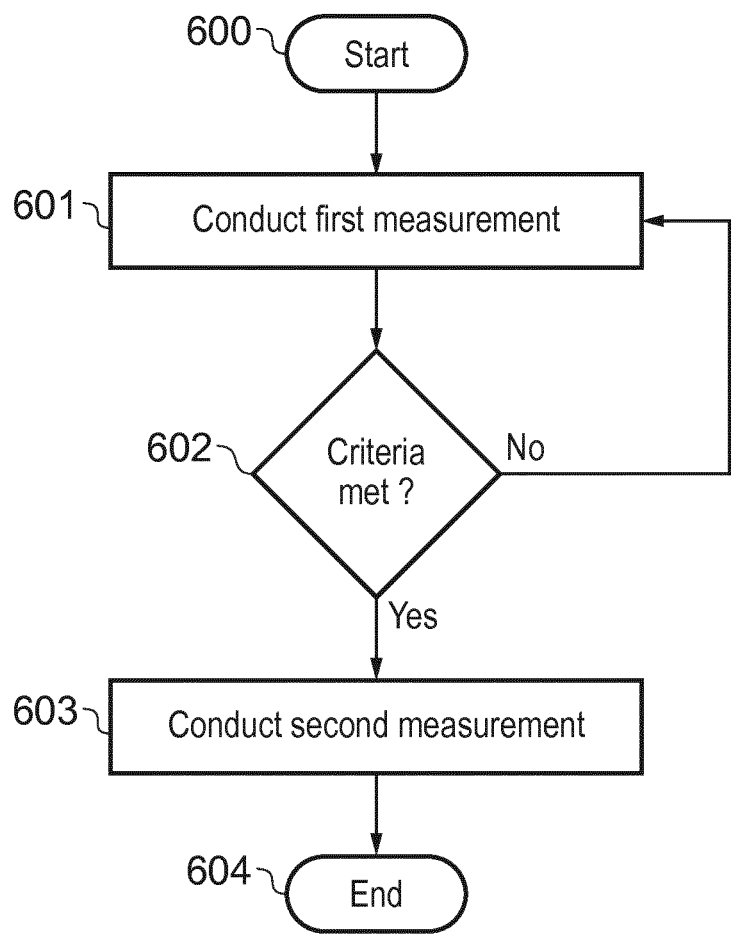
FIG. 6 shows a flow chart schematically illustrating a process according to the present technique.

FIG. 6 shows a flow chart schematically illustrating a process according to an embodiment of the present technique. This process is carried out by the controller 24 of the UE 12, for example. The process starts at step 600. At step 601, a first measurement of a parameter associated with a radio signal transmitted by infrastructure equipment of the wireless telecommunications network and received by a receiver of the UE is conducted. At step 602, it is determined whether the measured parameter meets a predetermined criteria. In the case that the measured parameter does not meet the predetermined criteria, the process returns to step 601. On the other hand, in the case that the measured parameter does meet the predetermined criteria, the process proceeds to step 603, in which a second measurement of a parameter associated with a radio signal transmitted by infrastructure equipment of the wireless telecommunications network and received by the receiver of the UE is conducted. The process then ends at step 604.

Various features of embodiments of the present technique are defined by the following numbered clauses.

1. A terminal device for use with a wireless telecommunications system, the terminal device comprising a receiver, a transmitter and a controller, wherein the controller is configured:
   to conduct a first measurement of a parameter associated with a radio signal transmitted by infrastructure equipment of the wireless telecommunications network and received by the receiver;
   to determine whether the measured parameter meets a predetermined criteria; and
   when the measured parameter is determined to meet the predetermined criteria, to conduct a second measurement of a parameter associated with a radio signal transmitted by infrastructure equipment of the wireless telecommunications network and received by the receiver.

2. A terminal device according to clause 1, wherein the first measurement is a measurement of a first parameter associated with a first radio reference signal and the second measurement is a measurement of a second parameter associated with a second radio reference signal.

3. A terminal device according to clause 2, wherein the first radio reference signal is received from first infrastructure equipment currently serving the terminal device and the second radio signal is received from second infrastructure equipment neighbouring the first infrastructure equipment.

4. A terminal device according to clause 2 or 3, wherein the first radio reference signal is a cell specific reference signal identifying a cell of the wireless telecommunications system and the second radio reference signal is a beam specific reference signal identifying a beam formed within a cell of the wireless telecommunications system.

5. A terminal device according to any one of clauses 2 to 4, the first radio reference signal is an idle mode reference signal and the second radio reference signal is a connected mode reference signal.

6. A terminal device according to any one of clauses 2 to 5, wherein the first parameter is a signal strength or signal quality of the first radio reference signal, the second parameter is a signal strength or signal quality of the second radio reference signal, and the predetermined criteria is that the signal strength or signal quality of the first radio reference signal falls below a predetermined threshold.

7. A terminal device according to any one of clauses 2 to 6, wherein the first radio reference signal is associated with a first measurement gap pattern and the second radio reference signal is associated with a second, different, measurement gap pattern.

8. A terminal device according to any preceding clause, wherein the first measurement is repeated at a first measurement rate and the second measurement is repeated at a second, different, measurement rate.

9. A method of operating a terminal device for use with a wireless telecommunications system, the method comprising:
   conducting a first measurement of a first parameter associated with a radio signal transmitted by infrastructure equipment of the wireless telecommunications network and received by a receiver of the terminal device;
   determining whether the measured parameter meets a predetermined criteria; and
   when the measured parameter is determined to meet the predetermined criteria, conducting a second measurement of a parameter associated with a radio signal transmitted by infrastructure equipment of the wireless telecommunications network and received by the receiver of the terminal device.

10. Circuitry for a terminal device for use with a wireless telecommunications system, the circuitry comprising controller circuitry configured:
   to conduct a first measurement of a parameter associated with a radio signal transmitted by infrastructure equipment of the wireless telecommunications network and received by a receiver of the terminal device;
   to determine whether the measured parameter meets a predetermined criteria; and
   when the measured parameter is determined to meet the predetermined criteria, to conduct a second measurement of a parameter associated with a radio signal transmitted by infrastructure equipment of the wireless telecommunications network and received by the receiver of the terminal device.

It will be appreciated that numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009
[2] RP-161596 "Revision of SI: Study on New Radio Access Technology," NTT DOCOMO, 3GPP TSG RAN Meeting #71, New Orleans, Sep. 19-22, 2016
[3] R2-166398 "Introduction of mobility enhancement UE capabilities", Huawei, HiSilicon, ZTE, 3GPP TSG-RAN2 Meeting #95bis, Kaohsiung, 10-14 Oct. 2016
[4] R2-167836 "Consideration on the RRM Measurement for NR", ZTE, ZTE Microelectronics, 3GPP TSG-RAN WG2 Meeting #96, Reno, USA, 14-18 Nov. 2016
[5] R2-168042 "Cell Quality Derivation based on Measurements from Individual Beams", Samsung, 3GPP TSG RAN WG2 #96, Reno, USA, 14-18 Nov. 2016
[6] R2-168511 "Measurements in NR", Intel Corporation, 3GPP TSG RAN WG2 Meeting #96, Reno, Nevada, 14-18 Nov. 2016
[7] R2-168724 "NR Cell association with beams for RRM measurements in connected mode", Ericsson, 3GPP TSG-RAN WG2 Meeting #96, Reno, US, 14-18 Nov. 2016

The invention claimed is:

1. A terminal device for use with a wireless telecommunications system, the terminal device comprising:
   a receiver;
   a transmitter; and
   circuitry configured to:
      conduct a first measurement, including a plurality of measurements taken at a first rate, of a first parameter of a cell specific reference signal (CRS) transmitted by first infrastructure equipment of the wireless telecommunications network and received by the receiver, the first parameter being a reference signal received power (RSRP) or a reference signal receive quality (RSRQ) of the CRS;
      determine whether the first parameter meets a predetermined criteria;
      in a case that the first parameter is determined to meet the predetermined criteria, conduct a second measurement, including a plurality of measurements taken at a second rate higher than the first rate, of a second parameter of a mobility reference signal (MRS) transmitted by second infrastructure equipment of the wireless telecommunications network and received by the receiver, the second parameter being a RSRP or a RSRQ of the MRS; and
      in a case that the first parameter is determined to not meet the predetermined criteria, reconduct the first measurement at the first rate of the first parameter of the CRS, wherein
      the first infrastructure equipment currently serves the terminal device and the second infrastructure equipment serves an area neighboring a service area of the first infrastructure equipment.

2. The terminal device according to claim 1, wherein the predetermined criteria is that the signal strength or signal quality of the CRS falls below a predetermined threshold.

3. The terminal device according to claim 1, wherein the CRS is associated with a first measurement gap pattern and the MRS is associated with a second measurement gap pattern different from the first measurement gap pattern.

4. The terminal device according to claim 1, wherein the circuitry is further configured to reconduct the first measurement until the first parameter is determined to meet the predetermined criteria.

5. The terminal device according to claim 1, wherein the circuitry uses the first measurement to trigger the second measurement.

6. The terminal device according to claim 1, wherein the circuitry is further configured to
   conduct the first measurement in a connected mode to compare idle mode reference signals, and
   trigger the second measurement of the MRS only in predetermined conditions.

7. The terminal device according to claim 6, wherein the terminal device satisfies the predetermined conditions in a case that the terminal device reaches a cell border.

8. The terminal device according to claim 6, wherein
   the MRS is transmitted with a narrower beam,
   the MRS identifies certain beams as well as a cell, and
   the circuitry is further configured to detect and identify more signals per cell than the idle mode signals require.

9. A method of operating a terminal device for use with a wireless telecommunications system, the method comprising:
   conducting a first measurement, including a plurality of measurements taken at a first rate, of a first parameter of a cell specific reference signal (CRS) transmitted by first infrastructure equipment of the wireless telecommunications network and received by a receiver of the terminal device, the first parameter being a reference signal received power (RSRP) or a reference signal receive quality (RSRQ) of the CRS;
   determining whether the first parameter meets a predetermined criteria;
   in a case that the first parameter is determined to meet the predetermined criteria, conducting a second measurement, including a plurality of measurements taken at a second rate higher than the first rate, of a second parameter of a mobility reference signal (MRS) transmitted by second infrastructure equipment of the wireless telecommunications network and received by the receiver of the terminal device, the second parameter being a RSRP or a RSRP of the MRS; and
   in a case that the first parameter is determined to not meet the predetermined criteria, reconducting the first measurement at the first rate of the first parameter of the CRS, wherein
   the first infrastructure equipment currently serves the terminal device and the second infrastructure equipment serves an area neighboring a service area of the first infrastructure equipment.

10. Circuitry for a terminal device for use with a wireless telecommunications system, the circuitry comprising:
   controller circuitry configured:
      conduct a first measurement, including a plurality of measurements taken at a first rate, of a first parameter of a cell specific reference signal (CRS) transmitted by first infrastructure equipment of the wireless telecommunications network and received by a receiver of the terminal device, the first parameter being a reference signal received power (RSRP) or a reference signal receive quality (RSRQ) of the CRS;

determine whether the first parameter meets a predetermined criteria:

in a case that the first parameter is determined to meet the predetermined criteria, conduct a second measurement, including a plurality of measurements taken at a second rate higher than the first rate, of a second parameter of a mobility reference signal (MRS) transmitted by second infrastructure equipment of the wireless telecommunications network and received by the receiver, the second parameter being a RSRP or a RSRQ of the MRS; and in a case that the first parameter is determined to not meet the predetermined criteria, reconduct the first measurement at the first rate of the first parameter of the CRS, wherein the first infrastructure equipment currently serves the terminal device and the second infrastructure equipment serves an area neighboring a service area of the first infrastructure equipment.

11. The circuitry according to claim 10, wherein the predetermined criteria is that the signal strength or signal quality of the CRS falls below a predetermined threshold.

12. The circuitry according to claim 10, wherein the CRS is associated with a first measurement gap pattern and the MRS is associated with a second measurement gap pattern different from the first measurement gap pattern.

13. The circuitry according to claim 10, wherein the controller circuitry is further configured to reconduct the first measurement until the first parameter is determined to meet the predetermined criteria.

* * * * *